United States Patent [19]

Simazaki et al.

[11] 4,217,514
[45] Aug. 12, 1980

[54] STATOR STRUCTURE FOR INDUCTION MOTOR

[75] Inventors: Yuzuru Simazaki, Hitachi; Ryota Doi, Nakamachi; Yuji Kumagai, Tokaimura; Ikou Fukazawa; Motoo Yamaguchi, both of Hitachi, all of Japan

[73] Assignee: Hitachi, Ltd., Tokyo, Japan

[21] Appl. No.: 907,301

[22] Filed: May 18, 1978

[30] Foreign Application Priority Data

May 23, 1977 [JP] Japan ............................. 52/58642

[51] Int. Cl.² ............................................ H02K 3/46
[52] U.S. Cl. .................................... 310/260; 310/42; 310/194; 310/271
[58] Field of Search ................. 310/166, 271, 91, 43, 310/42, 260, 259, 258, 254, 194, 214

[56] References Cited

U.S. PATENT DOCUMENTS

| | | | |
|---|---|---|---|
| 2,575,115 | 11/1951 | Linke | 310/260 UX |
| 3,979,822 | 9/1976 | Halm | 310/260 |
| 4,053,800 | 10/1977 | Hanning | 310/260 |
| 4,088,913 | 5/1978 | Prigorovsky | 310/260 |

FOREIGN PATENT DOCUMENTS 2018125  11/1971  Fed. Rep. of Germany ............. 310/43

*Primary Examiner*—R. Skudy
*Attorney, Agent, or Firm*—Craig & Antonelli

[57] ABSTRACT

A stator structure for the induction motor is disclosed, in which the winding accommodated in the slots of the stator iron core has one end portion, outside of the stator iron core, shaped to provide a flared bell-like opening, and the other end portion thereof, outside of the stator iron core, forming short-passed winding and being provided with an opening sufficiently large to permit insertion of the shaft of the rotor. Between the inner surface of the short-passed end portion and a given portion of the surface of the stator iron core a coil-supporting member is disposed. The outer surface of the coil-supporting member has a shape along the inner surface of the other coil end portion, while the inside thereof is so shaped as to provide a sufficient space or air gap with respect to the rotor to be inserted. The coil-supporting member is made of an elastic material and adapted to be forcibly fitted between the inner surface of the short-passed coil end portion and the given portion of the surface of the stator iron core from the opening of the bell-shaped coil end portion through the rotor-accommodating cavity formed in the stator core, thus closely contacting the inner surface of the short-passed end portion. Means is provided for bringing at least part of the coil-supporting member into close contact with the short-passed coil end portion and rendering them immovable with respect to each other.

17 Claims, 26 Drawing Figures

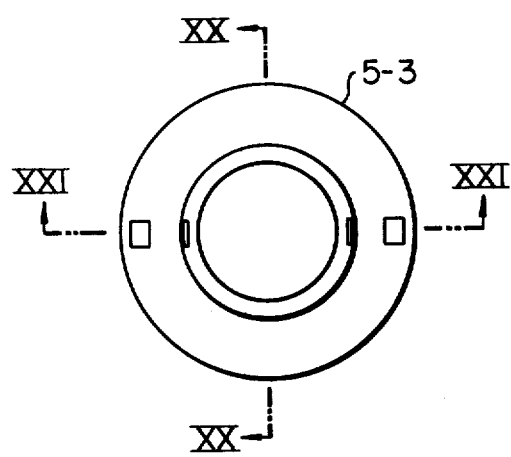
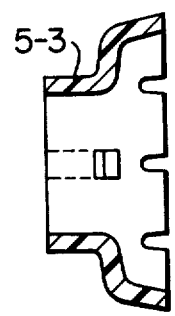
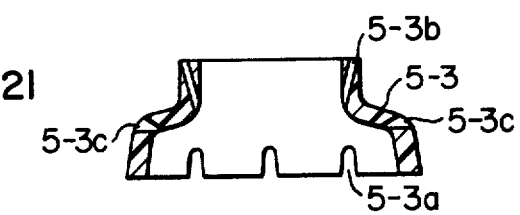
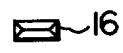
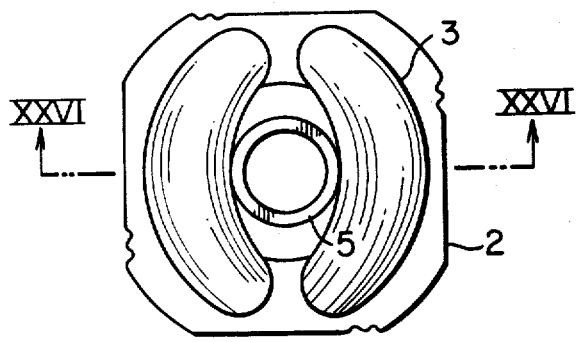
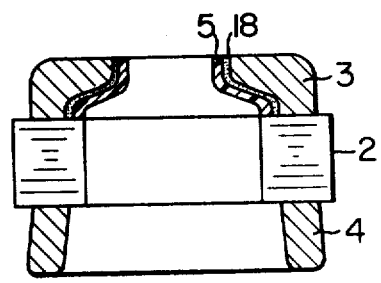

STATOR STRUCTURE FOR INDUCTION MOTOR

LIST OF THE PRIOR ART REFERENCE (37 CFR 1.56 (a))

The following reference is cited to show the state of the art:

West German Patent Application Laid-Open No. 2,018,125 (Offenlengungs Schrift No. 2,018,125)

BACKGROUND OF THE INVENTION

This invention relates to an induction motor, or more in particular to a stator structure of the induction motor.

One of the conventional methods for reducing the cost of a small induction motor is by reducing the overall size of the coil form and lessening the peripheral winding length of the coil inserted into the stator iron core, in order to save the amount of magnet wire. In view of the fact that the peripheral length of the winding inserted into the iron core of the stator is minimized as far as required, the forward end of the coil does not expand radially outward but extends substantially linearly. In other words, each conductor element of the winding passes along the shortest path with a U-shaped section. This is especially the case when the number of poles involved is small as in the case of a two-pole motor. For this reason, it is impossible to bind the coils with a braided rope by a lacing machine as is generally employed to fix the coil end. To overcome this problem, a coil-supporting member of plastics has been suggested as disclosed in the West German patent application Laid-Open No. 2,018,125. According to this prior art, the high moldability and elasticity of plastic material are utilized. In other words, a coil-supporting member of plastics molded into the shape along the inner surface of the short-passed coil end portion and also into the shape securing a sufficient distance from the rotor is inserted through the rotor-accommodating cavity formed in the stator iron core from the opening of the bell-shaped coil end portion and fitted on the inner surface of the short passed coil end portion. The coil-supporting member thus fitted supports the short-passed coil end portion directly, thereby preventing the winding from being loosened in the process of manufacture or in operation on the one hand while at the same time defining the opening for securing the passage of the rotor shaft on the other hand.

As a result of an aging test conducted on the motor as configured above, it has been found that with passage of time, contraction of the coil-supporting member and the out-of-phase condition of relative vibrations of the short-passed coil end portion and the coil-supporting member causes a backlash or looseness therebetween. This backlash is a source of not only a noise but a friction between the coil enameled wire and the coil-supporting member to damage the insulating cover of the enameled wire of the coil. In an extreme case, the coil-supporting member is brought into contact with the rotor or rotor shaft and broken, with the result that the broken pieces of the supporting-member intrude into the air gap between the rotor and the stator iron core, often locking the motor.

In order to solve these problems, the inventors discussed the use of a thermo-setting resin in place of the thermo-plastic as the material of the coil-supporting member in vain. Since the thermo-setting resin is less elastic than the thermo-plastic, it is not easy to insert the coil-supporting member of the thermo-setting resin from the bell-shaped coil end side. Further, it cannot be successfully fitted on the inner surface of the short-passed coil end portion.

SUMMARY OF THE INVENTION

An object of the present invention is to provide a stator structure having an improved coil-end support construction without the above-mentioned disadvantages of the prior art.

According to the present invention, there is provided a stator structure in which the winding accommodated in the slots of the stator iron core has, outside of one surface of the stator iron core, one end shaped to provide a flared bell-like opening, and also has, outside of the other opposite surface of the stator iron core, the other end thereof forming short-passed coiles and provided with an opening sufficiently large to permit insertion of the shaft of the rotor. Between the inner surface of the short-passed end portion and the surface of the stator iron core, a coil-supporting member is disposed. The outside of the coil-supporting member has a shape along the inner surface of the other coil end portion, while the inside surface thereof is so shaped as to provide a sufficient space with respect to the rotor to be inserted. The coil-supporting member is made of an elastic material and adapted to be foricibly fitted between the inner surface of the short-passed coil end portion and the surface of the iron core from the opening of the bell-shaped coil end portion through the rotor-accommodating cavity formed in the stator core, thus closely contacting the inner surface of the short-passed end portion. Also, means is provided for bringing at least part of the coil-supporting member into close contact with the short-passed coil end portion and rendering them immovable with respect to each other.

BRIEF DESCRIPTION OF THE DRAWINGS

FIG. 19 is a top plan view of the coil-supporting member according to still another embodiment of the present invention.

FIG. 20 is a sectional view of the coil-supporting member taken in line XX—XX in FIG. 19.

FIG. 21 is a sectional view of the coil-supporting member taken in line XXI—XXI in FIG. 19.

FIG. 22 is a top plan view of a band used with the coil-supporting member shown in FIG. 19.

FIG. 23 is a side view of the band shown in FIG. 22.

FIG. 24 is a perspective view of the band shown in FIG. 22.

FIG. 25 is a top plan view of the stator of the compressor motor according to another embodiment of the present invention.

FIG. 26 is a sectional view of the stator taken in line XXVI—XXVI in FIG. 25.

DESCRIPTION OF PREFERRED EMBODIMENTS

To facilitate the understanding of the present invention, the prior art will be described more in detail with reference to FIGS. 1 to 6 before explaining the preferred embodiments of the present invention.

Figure 1:
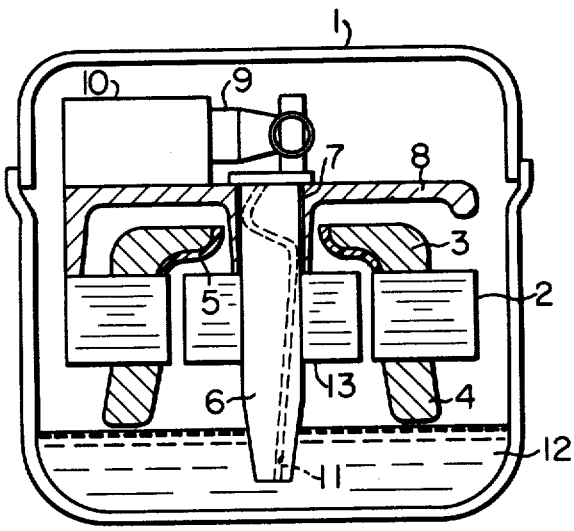
FIG. 1 is a cross sectional view showing a conventional sealed induction motor for a compressor.
Figure 2:
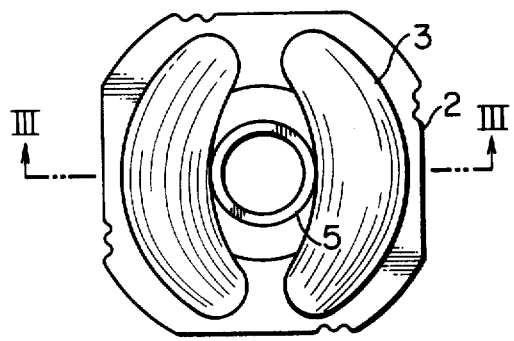
FIG. 2 is a plan view of the stator of the motor shown in FIG. 1.

A sealed compressor motor according to the prior art is shown in FIG. 1. Reference numeral 1 shows a chamber, numeral 2 an iron core for the stator, numeral 3 one coil end or short-passed coil end portion, numeral 4 the other coil end or bell-shaped coil end portion, numeral 5 a coil-supporting member, numeral 5a slots, numeral 6 a rotor shaft, numeral 7 a bearing, numeral 8 a frame, numeral 9 a piston, numeral 10 a cylinder, numeral 11 an oil suction duct, numeral 12 oil, numeral 13 a rotor, and numeral 14 a conductive wire.

Chamber 1 contains a refrigerant and oil 12. In this environment, rotation of the motor rotor 13 causes the reciprocal motion of the piston 9, so that a compressed refrigerant gas is introduced into a refrigeration cycle. In fabricating the motor stator, the coil wound by a winding machine is assembled into the iron core 2 by a wire-assembling machine. The coil end portions 3 and 4 are shaped by a shaping machine. The coil-supporting member 5 is inserted through the rotor accommodating cavity formed in the iron core 2 from the opening of the bell-shaped coil end side 4 and fitted between the inner surface of the short-passed coil end portion 3 and the iron core 2. The slots 5a of the coil-supporting member 5 are effective in that while the member 5 is inserted, the outer diameter of the coil-supporting member 5 is reduced somewhat by the external force thereby to facilitate the insertion thereof through the cavity of the iron core 2 and the opening of the bell-shaped coil end portion 4 and that, after the member 5 is fitted on the short-passed coil end portion 3, the member 5 is restored outward by elasticity.

Next, preferred embodiments of the present invention will be described with reference to the accompanying drawings FIGS. 7 to 26. The reference numerals used in FIGS. 1 to 6 denote the same or like component elements as corresponding ones in all the drawings from FIGS. 7 to 26.

Figure 6:
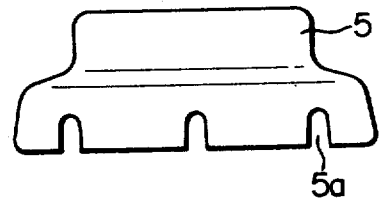
FIG. 6 is a front view showing the coil-supporting member used in the motor of FIG. 1.
Figure 4:
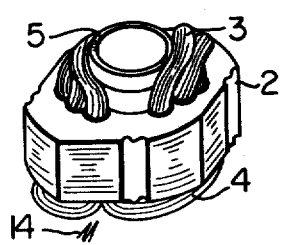
FIG. 4 is a perspective view of the stator of the motor in FIG. 1.
Figure 7:
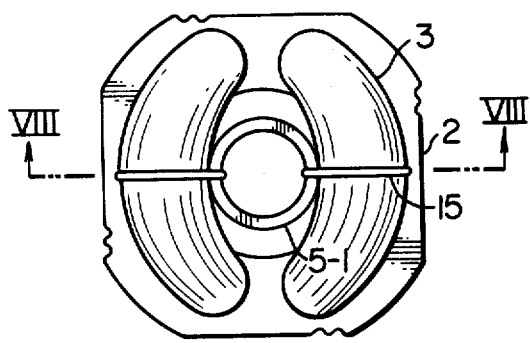
FIG. 7 is a top plan view of the stator of the compressor motor according to an embodiment of the present invention.
Figure 10:
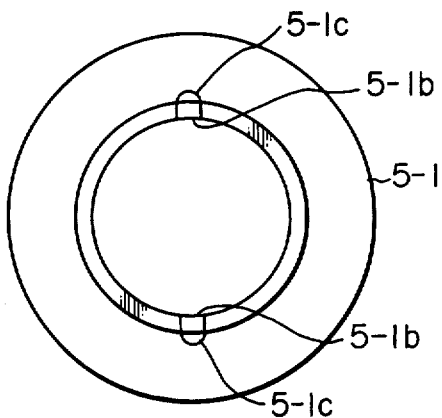
FIG. 10 is a top plan view of the coil-supporting member according to an embodiment of the present invention.
Figure 8:
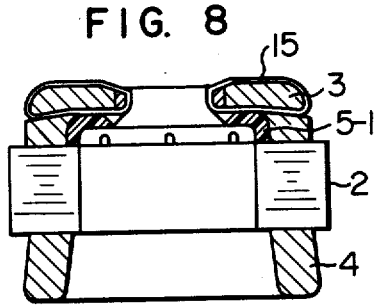
FIG. 8 is a sectional view of the stator taken in line VIII—VIII in FIG. 7.
Figure 11:
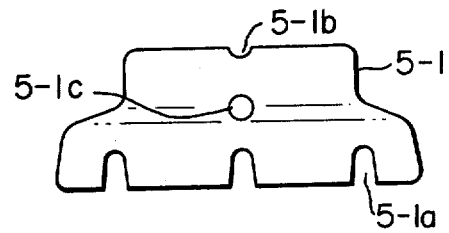
FIG. 11 is a front view of the coil-supporting member shown in FIG. 10.
Figure 9:
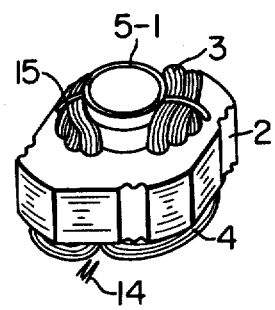
FIG. 9 is a perspective view of the stator shown in FIG. 7.
Figure 12:
FIG. 12 is a perspective view showing a polyester rope for binding the coil-supporting member and the coil according to an embodiment of the present invention.

A first preferred embodiment of the present invention is shown in FIGS. 7 to 12. The stator structure shown in this embodiment is similar to that of the conventional compressor motor shown in FIG. 1, and is so constructed that after assembling the winding in the stator iron core 2, the coil end portions 3 and 4 are shaped. Through the opening of the bell-shaped coil end portion 4, the coil-supporting member 5-1 is inserted along the inner periphery of the rotor-accommodating cavity of the stator iron core 2, and fitted between the inside surface of the short-passed coil end portion 3 and the stator iron core 2. After that, the assembly is bound with a braided rope 15. The coil-supporting member 5-1 in this configuration will be described more particularly. The coil-supporting member 5-1 is formed with a plurality of slots 5-1a, a plurality of slots 5-1b, and a plurality of holes 5-1c. The slots 5-1b and holes 5-1c are respectively for winding the braided rope 15 on the short-passed coil end portion 3. A perspective view of the braided rope 15 is shown in FIG. 12. As the material of the coil supporting member 5-1, a thermo-plastic such as polybutylene terephthalate or polyester reinforced by glass fiber was used; and as the material of the braided rope, polyester was employed. These materials maintained superior electrical and mechanical characteristics in an environment of such a refrigerant as dichlorodifluoromethane (flon-12) and naphthenic mineral oil 12. By providing the slots 5-1b and holes 5-1c, the rope is prevented from being displaced in the circumferential direction. Numeral 5-1a shows slots having the same functions as the slots 5a in FIG. 6. The slots 5-1b and holes 5-1c, as shown in FIGS. 10 and 11, are provided in the number of two respectively, so that, preferably, the two braided ropes 15 are wound over the shortest distance, with the result that, when viewed in a top plan view, the ropes 15 are aligned in a straight line as shown in FIG. 7.

Instead of winding the braided ropes 15 through the slots 5-1b and holes 5-1c formed in the coil supporting member 5-1, they may alternatively be wound through the slots 5-1b and 5-1a without providing the holes 5-1c.

Figure 16:
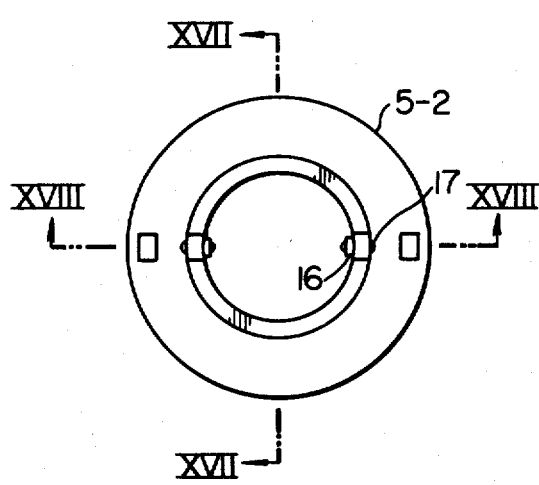
FIG. 16 is a top plan view of the coil-supporting member according to another embodiment of the present invention.
Figure 17:
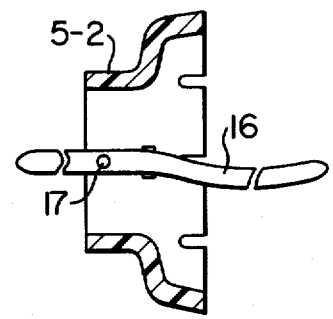
FIG. 17 is a sectional view of the coil-supporting member taken in line XVII—XVII in FIG. 16.
Figure 18:
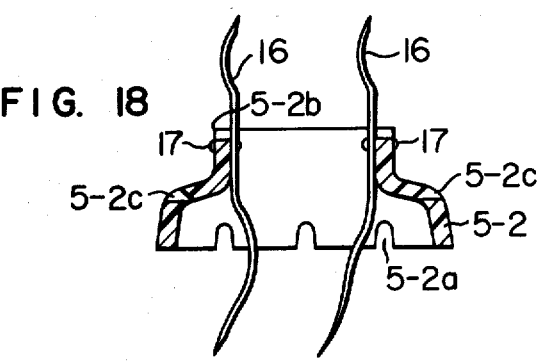
FIG. 18 is a sectional view of the coil-supporting membet taken in line XVIII—XVIII in FIG. 16.

A second embodiment is the stator structure shown in FIGS. 13 to 18. This stator structure, like the first embodiment, is for a compressor motor and is different from the first embodiment in that bands are used instead of the braided ropes. A stator with the bands wrapped on an assembled coil is shown in the top plan view of FIG. 13, the sectional view of FIG. 14 and the perspective view of FIG. 15. First, after shaping the coil end portions 3 and 4, the coil-supporting member 5-2 is inserted along the inner periphery of the rotor accommodating cavity of the stator iron core 2 from the opening of the bell-shaped coil end portion 4 and fitted between the inside surface of the short-passed coil end portion 3 and the stator iron core 2, followed by the wrapping of the assembly with a plurality of bands 16. A specific example of the coil-supporting member 5-2 used in this configuration is shown in FIGS. 16 to 18. A plurality of bands 16 are fixed in advance on the straight port of the inside surface of the coil-supporting member 5-2 by means of rivets 17, so that the coil-supporting member with the bands is adapted to be fitted between the inside surface of the short-passed coil end portion 3 and the stator iron core 2. After that, the bands 16 are wound on the short-passed coil end portion 3 through the holes 5-2c and the slots 5-2b, and the ends thereof are welded. The slots 5-2a have the same functions as the slots 5a in FIG. 6.

Another embodiment of the coil-supporting member is shown in FIGS. 19, 20 and 21. The coil-supporting member 5-3 with the bands 16 fitted in the slots or elongated holes 5-3b is inserted from the opening of the bell-shaped coil end portion 4 and fitted between the inside surface of the short-passed coil end portion 3 and the iron core 2. Then the bands 16 are wound on the coil end portion 3 and the ends thereof are welded. The bands 16 are constructed as shown in FIGS. 22 to 24. This construction is effective in shortening the time of assembly work.

As the material of the coil-supporting members 5-2 and 5-3, such thermo-plastic as polybutylene terephthalate or polyester reinforced by glass fiber is suitable, and as the material of the band 16, heat-resistant nylon is preferred, for their high moldability and workability. Not only in gases but in the environment of flon-12 and naphthenic mineral oil 12 mentioned with reference to the first embodiment, these materials maintain superior electrical and mechanical characteristics.

Further, as a material of the rivets 17, the same material as that of the coil-supporting member or such a metal as copper or brass is preferred.

Figure 13:
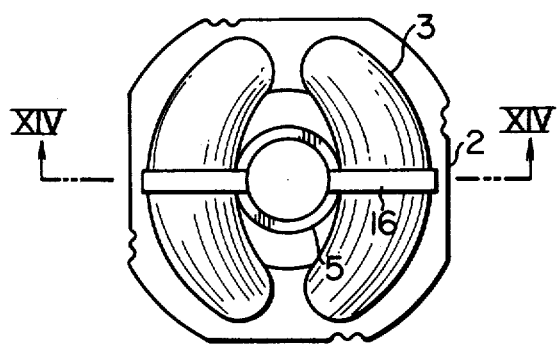
FIG. 13 is a top plan view showing the stator of the compressor motor according to another embodiment of the invention.
Figure 14:
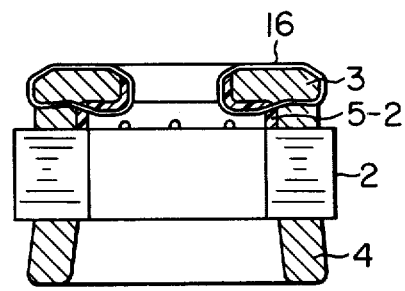
FIG. 14 is a sectional view of the stator taken in line XIV—XIV in FIG. 13.
Figure 15:
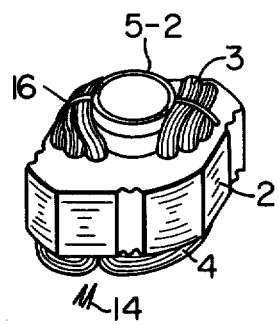
FIG. 15 is a perspective view of the stator shown in FIG. 13.

In the embodiment under consideration, as in the first embodiment, it is preferable to use a couple of bands for binding the short-passed coil end portion in such a manner that in a top plan view, the two bands 16 are aligned in a straight line as shown in FIG. 13. As explained with reference to the first embodiment, the holes 5-2c or 5-3c may be replaced with equal effect by the slots 5-2b or 5-3b and 5-2a or 5-3a to bind the bands.

Figure 5:
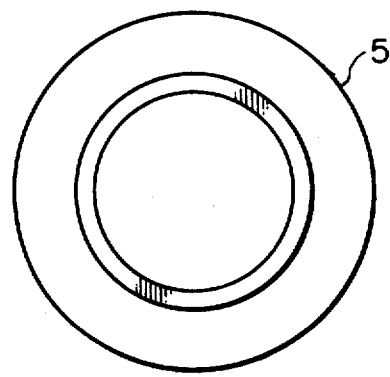
FIG. 5 is a top plan view of the coil-supporting member used in the motor shown in FIG. 1.
Figure 3:
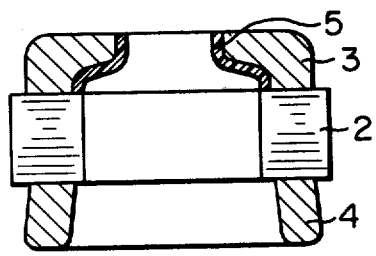
FIG. 3 is a sectional view taken in line III—III in FIG. 2.

A third embodiment is shown in FIGS. 25 and 26, in which the same coil-supporting member as the conventional one shown in FIGS. 5 and 6 is used. In particular, after being inserted along the inner periphery of the rotor accommodating cavity of the stator iron core 2 from the opening of the bell-shaped coil end portion 4 and fitted between the inside surface of the short-passed coil end portion 3 and the iron core 2, the coil-supporting member 5 is bonded with the short-passed coil end portion 3 by a bonding agent 18.

In the experimental processes of assembly work, the bonding agent 18 was coated on the inside surface of the short-passed coil end portion 3 and the outside surface of the coil-supporting member 5 immediately before fitting the coil-supporting member 5 between the coil end portion 3 and the stator iron core 2. Then, the coil-supporting member 5 was fitted and bonded by heat. The same material as explained with reference to the first and second embodiments was used for the coil-supporting member 5. As the bonding agent 18, an epoxy bonding agent was used, and by being subjected to heat treatment at 130° C. for 2 hours, displayed a high bonding strength. This bonding agent 18 maintained a sufficiently high bonding strength in the environment of flon-12 and naphthenic mineral oil 12 as well as in a gas, thus preventing the looseness between the coil-supporting member 5 and the coil 3 which was the greatest source of fear in the conventional methods, on the one hand, and completely preventing the coil-supporting member 5 from coming off on the other hand.

Further, a combination of the first or second embodiment and the third embodiment is higher in reinforcing effect. In such a combination, the coil-supporting member 5 is fitted between the inside surface of the short-passed coil end portion 3 and the iron core 2 and bound by ropes or wrapped by bands, after which the outside surface of the coil-supporting member and the inside surface of the short-passed coil end portion are bonded with each other by means of a bonding agent previously applied to them.

With the increase in the number of turns of the ropes or bands, the binding force is of course increased, although the increase in the number of turns is not desirable since it causes an increased number of assembly steps. It is, therefore, essential that the number of turns of the ropes or bands be minimized. In a preferred embodiment of the present invention, two ropes are wound in two or three turns respectively on the short-passed coil end portion 3 in such a manner as to be aligned in a straight line in a top plan view, or two bands are wrapped in one turn respectively on the short-passed coil end portion 3 in such a manner as to be aligned in a straight line in a top plan view. An aging test conducted on a motor with the ropes or bands wound or wrapped in the above-mentioned manner successfully shows that no looseness is caused between the coil-supporting member 5 and the coil. The coil-supporting member 5 is of course prevented also from coming off, thereby providing a highly reliable small motor.

We claim:

1. A stator structure for an induction motor, comprising:

a stator iron core having a cavity for rotatably accommodating a rotor;

a winding assembly accommodated in said stator iron core, said winding assembly having first and second coil end portions opposed to each other with respect to said stator iron core, said first coil end portion being shaped to have a bell-shaped flared opening, said second coil end portion forming a short-passed winding and being shaped to have an opening sufficiently large for a shaft of the rotor to pass therethrough in the presence of the rotor in said cavity;

a coil-supporting member firmly held between said second coil end portion and a given portion of the outside surface of said stator iron core, said coil-supporting member having an outer surface shaped along the inside surface of said second coil end portion and an inner surface shaped to provide a sufficient air gap between said inner surface and the rotor, when the rotor is accommodated in said cavity in use, said coil-supporting member being made of an elastic material and elastically force-fit mounted between the inside surface of said second coil end portion and the given portion of the outside surface of said stator iron core in close contact with the inside surface of said second coil end portion; and means for bringing at least part of said coil-supporting member into close contact with said second coil end portion and rendering them relatively immovable, in which said close contact member includes means for binding together the predetermined part of said coil-supporting member and the conducting elements of said second coil end portion, and said binding means include a plurality of braided ropes of polyester fiber, said coil-supporting member being formed with a plurality of first slots at one end portion thereof adjacent to the shaft-passing opening of said second coil end portion and a plurality of holes at predetermined parts between said one end portion and the other end portion opposite thereto, each of said braided ropes extending through selected one of said first slots and selected one of said holes corresponding to said selected one of said first slots, thereby binding the conductor elements of said second coil end portion on a predetermined part of said coil-supporting member.

2. A stator structure according to claim 1 or 4 or 7 or 9 or 11 or 14, in which the outer surface of said coil-supporting member and the inside surface of said second coil end portion are bonded to each other by a bonding agent interposed therebetween.

3. A stator structure according to claim 1, in which said braided ropes are two in number, said first slots and said holes being also two in number respectively, said two braided ropes being aligned in a straight line in a top plan view when the conductor elements of said second coil end portion are bound on the predetermined part of said coil-supporting member.

4. A stator structure for an induction motor, comprising:

a stator iron core having a cavity for rotatably accommodating a rotor;

a winding assembly accommodated in said stator iron core, said winding assembly having first and second coil end portions opposed to each other with respect to said stator iron core, said first coil end portion being shaped to have a bell-shaped flared opening, said second coil end portion forming a short-passed winding and being shaped to have an opening sufficiently large for a shaft of the rotor to pass therethrough in the presence of the rotor in said cavity;

a coil-supporting member firmly held between said second coil end portion and a given portion of the outside surface of said stator iron core, said coil-supporting member having an outer surface shaped along the inside surface of said second coil end portion and an inner surface shaped to provide a sufficient air gap between said inner surface and the rotor, when the rotor is accommodated in said cavity in use, said coil-supporting member being made of an elastic material and elastically force-fit mounted between the inside surface of said second coil end portion and the given portion of the outside surface of said stator iron core in close contact with the inside surface of said second coil end portion; and means for bringing at least part of said coil-supporting member into close contact with said second coil end portion and rendering them relatively immovable, in which said close contact means includes means for binding together the predetermined part of said coil-supporting member and the conducting elements of said second coil end portion, and said binding means include a plurality of bands made of a plastic material, said coil supporting member being formed with a plurality of first slots at one end portion thereof adjacent to the shaft-passing opening of said second coil end portion and a plurality of holes at predetermined parts between said one end portion and the other end portion opposite thereto, each of said bands extending through selected one of said first slots and selected one of said holes corresponding to said selected one of said first slots, thereby binding the conductor elements of said second coil end portion on a predetermined part of said coil-supporting member.

5. A stator structure according to claim 4, in which said bands are two in number, said first slots and said slots being also two in number respectively, said two bands being aligned in a straight line in a top plan view when the conductor elements of said second coil end portion are bound on the predetermined part of said coil-supporting member.

6. A stator structure according to claim 4, in which each of said bands is fixedly attached to a predetermined part of said coil-supporting member.

7. A stator structure for an induction motor, comprising:

a stator iron core having a cavity for rotatably accommodating a rotor;

a winding assembly accommodated in said stator iron core, said winding assembly having first and second coil end portions opposed to each other with respect to said stator iron core, said first coil end portion being shaped to have a bell-shaped flared opening, said second coil end portion forming a short-passed winding and being shaped to have an opening sufficiently large for a shaft of the rotor to pass therethrough in the presence of the rotor in said cavity;

a coil-supporting member firmly held between said second coil end portion and a given portion of the outside surface of said stator iron core, said coil-supporting member having an outer surface shaped along the inside surface of said second coil end portion and an inner surface shaped to provide a sufficient air gap between said inner surface and the rotor, when the rotor is accommodated in said cavity in use, said coil-supporting member being made of an elastic material and elastically force-fit mounted between the inside surface of said second coil end portion and the given portion of the outside surfaces of said second coil end portion; and means for bringing at least part of said coil-supporting member into close contact with said second coil end portion and rendering them relatively immovable, in which said close contact means includes means for binding together the predetermined part of said coil-supporting member and the conducting elements of said second coil end portion, wherein said coil member has two opposite end portions and a plurality of first slots are formed at one of the two end portions, said one end portion being in contact with the given portion of the outside surface of said stator iron core, said first slots acting as a means, in addition to the elasticity of the member, to form the elastic force-fit mounting of the coil-supporting member between the inside surface of said second coil end portion and said given portion, and in which said binding means include a plurality of braided ropes of polyester fiber, said coil-supporting member being formed with a plurality of second slots at the other end portion thereof adjacent to the shaft-passing opening of said second coil end portion, each of said braided ropes extending through selected one of said first slots and selected one of said second slots corresponding to said selected one of said first slots, thereby binding the conductor elements of said second coil end portion on a predetermined part of said coil-supporting member.

8. A stator structure according to claim 7, in which said braided ropes are two in number, said second slots being also two in number, said two braided ropes being aligned in a straight line in a top plan view when the conductor elements of said second coil end portion are bound on the predetermined part of said coil supporting member.

9. A stator structure for an induction motor, comprising:
- a stator iron core having a cavity for rotatably accommodating a rotor;
- a winding assembly accommodated in said stator iron core, said winding assembly having first and second coil end portions opposed to each other with respect to said stator iron core, said first coil end portion being shaped to have a bell-shaped flared opening, said second coil end portion forming a short-passed winding and being shaped to have an opening sufficiently large for a shaft of the rotor to pass therethrough in the presence of the rotor in said cavity;
- a coil-supporting member firmly held between said second coil end portion and a given portion of the outside surface of said stator iron core, said coil-supporting member having an outer surface shaped along the inside surface of said second coil end portion and an inner surface shaped to provide a sufficient air gap between said inner surface and the rotor when the rotor is accommodated in said cavity in use, said coil-supporting member being made of an elastic material and elastically force-fit mounted between the inside surface of said second coil end portion of the outside surface of said stator iron core in close contact with the inside surface of said second coil end portion;
- means for bringing at least part of said coil-supporting member into close contact with said second coil end portion and rendering them relatively immovable,
- in which said close contact means includes means for binding together the predetermined part of said coil-supporting member and the conducting elements of said second coil end portion, wherein said coil member has two opposite end portions and a plurality of first slots are formed at one of the two end portions, said one end portion being in contact with the given portion of the outside surface of said stator iron core, said first slots acting as a means, in addition to the elasticity of the member, to form the elastic force-fit mounting of the coil-supporting member between the inside surface of said second coil end portion and said given portion, and in which said binding means is a plurality of braided ropes of polyester fiber, said coil-supporting member being formed with a plurality of second slots at the other end portion thereof adjacent to said shaft-passing opening of said second coil end portion and a plurality of holes at predetermined parts between said two opposite end portions, each of said braided ropes extending through selected one of said second slots and selected one of said holes corresponding to said selected one of said second slots, thereby binding the conductor elements of said second coil end portion on said predetermined part of said coil supporting member.

10. A stator structure according to claim 9, in which said braided ropes are two in number, said second slots and said holes also two in number respectively, said two braided ropes being aligned in a straight line in a top plan view when the conductor elements of said second coil end portion are bound on the predetermined part of said coil-supporting member.

11. A stator structure for an induction motor, comprising:
- a stator iron core having a cavity for rotatably accommodating a rotor;
- a winding assembly accommodated in said stator iron core, said winding assembly having first and second coil end portions opposed to each other with respect to said stator iron core, said first coil end portion being shaped to have a bell-shaped flared opening, said second coil end portion forming a short-passed winding and being shaped to have an opening sufficiently large for a shaft of the rotor to pass therethrough in the presence of the rotor in said cavity;
- a coil-supporting member firmly held between said second coil end portion and a given portion of the outside surface of said stator iron core, said coil-supporting member having an outer surface shaped along the inside surface of said second coil end portion and an inner surface shaped to provide a sufficient air gap between said inner surface and the rotor when the rotor is accommodated in said cavity in use, said coil-supporting member being made of an elastic material and elastically force-fit mounted between the inside surface of said second coil end portion of the outside surface of said stator iron core in close contact with the inside surface of said second coil end portion; and
- means for bringing at least part of said coil-supporting member into close contact with said second coil end portion and rendering them relatively immovable,
- in which said close contact means includes means for binding together the predetermined part of said coil-supporting member and the conducting elements of said second coil end portion, wherein said coil member has two opposite end portions and a plurality of first slots are formed at one of the two end portions, said one end portion being in contact with the given portion of the outside surface of said stator iron core, said first slots acting as a means, in addition to the elasticity of the member, to form the elastic force-fit mounting of the coil-supporting member between the inside surface of said second coil end portion and said given portion, and in which said binding means include a plurality of plastic bands, said coil-supporting member being formed with a plurality of second slots at the other end portion thereof adjacent to said shaft-passing opening of said second coil end portion, each of said bands extending through selected one of said second slots and selected one of said first slots corresponding to said selected one of said second slots, thereby binding the conductor elements of said second coil end portion on the predetermined part of said coil-supporting member 12. A stator structure according to claim 11, in which said bands are two in number, said second slots being also two in number, said two bands being aligned in a straight line in a top plan view when the conductor elements of said second coil end portion are bound on the predetermined part of said coil-supporting member.

13. A stator structure according to claim 11, in which each of said bands is fixedly attached to a predetermined part of said coil-supporting member.

14. A stator structure for an induction motor, comprising:
 a stator iron core having a cavity for rotatably accommodating a rotor;
 a winding assembly accommodated in said stator iron core, said winding assembly hving first and second coil end portions opposed to each other with respect to said stator iron core, said first coil end portion being shaped to have a bell-shaped flared opening, said second coil end portion forming a short-passed winding and being shaped to have an opening sufficiently large for a shaft of the rotor to pass therethrough in the presence of the rotor in said cavity;
 a coil-supporting member firmly held between said second coil end portion and a given portion of the outside surface of said stator iron core, said coil-supporting member having an outer surface shaped along the inside surface of said second coil end portion and an inner surface shaped to provide a sufficient air gap between said inner surface and the rotor when the rotor is accommodated in said cavity in use, said coil-supporting member being made of an elastic material and elastically force-fit mounted between the inside surface of said second coil end portion of the outside surface of said stator iron core in close contact with the inside surface of said second coil end portion; and
 means for bringing at least part of said coil-supporting member into close contact with said second coil end portion and rendering them relatively immovable,
 in which said close contact means includes means for binding together the predetermined part of said coil-supporting member and the conducting elements of said second coil end portion, wherein said coil member has two opposite end portions and a plurality of first slots are formed at one of the two end portions, said one end portion being in contact with the given portion of the outside surface of said stator iron core, said first slots acting as a means, in addition to the elasticity of the member, to form the elastic force-fit mounting of the coil-supporting member between the inside surface of said second coil end portion and said given portion, and in which said binding means include a plurality of plastic bands, said coil-supporting member being formed with a plurality of second slots at the other end portion thereof adjacent to said shaft-passing opening of said second coil end portion, and a plurality of holes at predetermined parts between said two opposite end portions, each of said bands being passed through selected one of said second slots and selected one of said holes corresponding to said selected one of said second slots, thereby binding the conductor elements of said second coil end portion on the predetermined parts of said coil-supporting member.

15. A stator structure according to claim 14, in which said bands are two in number, said second slots and said holes being also two in number respectively, said two bands being aligned in a straight line in a top plan view when the conductor elements of said second coil end portion are bound on the predetermined part of said coil-supporting member.

16. A stator structure according to claim 14, in which each of said bands is fixedly attached to a predetermined part of said coil-supporting member.

17. A stator structure for an induction motor, comprising:
 a stator iron core having a cavity for rotatably accommodating a rotor;
 a winding assembly accommodated in said stator iron core, said winding assembly having first and second coil end portions opposed to each other with respect to said stator iron core, said first coil end portion being shaped to have a bell-shaped flared opening, said second coil end portion forming a short-passed winding and being shaped to have an opening sufficiently large for a shaft of the rotor to pass therethrough in the presence of the rotor in said cavity;
 a coil-supporting member firmly held between said second coil end portion and a given portion of the outside surface of said stator iron core, said coil-supporting member having an outer surface shaped along the inside surface of said second coil end portion and an inner surface shaped to provide a sufficient air gap between said inner surface and the rotor when the rotor is accommodated in said cavity in use, said coil-supporting member being made of such an elastic material so to allow said coil-supporting member to be elastically forcibly fitted between the inside surface of said second coil end portion and the given portion of the outside surface of said stator iron core through said cavity from said opening of said first coil end portion so as to bring said coil-supporting member into close contact with the inside surface of said second coil end portion in fabricating said stator structure, said coil-supporting member having two opposite end portions and a plurality of slots formed at one of the two end portions, said one end being in contact with the given portion of the outside surface of said stator iron core, said slots of said coil-supporting member acting as a means, in addition to the elasticity of said member, to form the elastic force-fit mounting of the coil-supporting member between the inside surface of said second coil end portion and said given portion; and
 means for binding together at least part of said coil-supporting member and the conductor elements of said second coil end portion through said slots of said coil-supporting member, said slots forming a means to prevent said binding means from freely displacing in use.

* * * * *